US007011037B2

(12) United States Patent
Cooperman

(10) Patent No.: US 7,011,037 B2
(45) Date of Patent: *Mar. 14, 2006

(54) CHANGED CONDITION INDICATOR

(76) Inventor: Isadore Cooperman, 62 Ivy Rd., Freehold, NJ (US) 97728-3033

(*) Notice: Subject to any disclaimer, the term of this patent is extended or adjusted under 35 U.S.C. 154(b) by 0 days.

This patent is subject to a terminal disclaimer.

(21) Appl. No.: 10/782,801

(22) Filed: Feb. 23, 2004

(65) Prior Publication Data

US 2004/0182304 A1 Sep. 23, 2004

Related U.S. Application Data

(63) Continuation-in-part of application No. 09/925,538, filed on Aug. 10, 2001, now Pat. No. 6,694,913.

(51) Int. Cl.
*G01K 1/02* (2006.01)

(52) U.S. Cl. ....................... 116/216; 116/206; 116/207; 374/106

(58) Field of Classification Search ........ 116/216–220, 116/206–207; 374/106, 160, 162
See application file for complete search history.

(56) References Cited

U.S. PATENT DOCUMENTS

| | | | | |
|---|---|---|---|---|
| 2,823,131 A | | 2/1958 | Powder | 116/207 |
| 2,850,393 A | * | 9/1958 | Romito | 116/207 |
| 3,177,843 A | * | 4/1965 | Geocaris | 116/219 |
| 3,233,459 A | * | 2/1966 | Loomis et al. | 374/106 |
| 3,389,194 A | | 6/1968 | Somerville | 264/4 |
| 3,695,903 A | | 10/1972 | Telkes et al. | 116/207 |
| 3,751,382 A | | 8/1973 | Ljunberg et al. | 435/12 |
| 3,786,777 A | | 1/1974 | Smith et al. | 116/206 |

(Continued)

FOREIGN PATENT DOCUMENTS

GB 2130720 6/1984

*Primary Examiner*—Christopher W. Fulton
*Assistant Examiner*—Tania Courson
(74) *Attorney, Agent, or Firm*—Mathews, Shepherd, McKay & Bruneau, P.A.

(57) ABSTRACT

A device and method of making a device for indicating a change in condition is disclosed. A first embodiment is a device for indicating a transition from a frozen condition to a thawed condition is disclosed. The device includes a housing and a capsule. A first reactant and a liquid are included within the capsule. The liquid is chosen such that it expands upon freezing. The capsule is sized such that when the liquid freezes and expands, the capsule fractures. A second reactant is provided within the housing. The location of the second reactant and the method of attaching (if any) the second reactant to the housing may take various forms. When the liquid within the capsule freezes, it expands and fractures the capsule. Upon thawing, the reactant within the capsule escapes and mixes with the reactant located outside the capsule. A second embodiment is a time-temperature indicator. A flexible housing is used, allowing the user to manually deform the housing to fracture a capsule enclosed therein. The reactants combine to produce a color. The color is chosen to be a different color than the housing, allowing a person viewing the indicator device to quickly and easily determine the status of the object being monitored. The threshold temperature at which the device will indicate a changed condition may be varied. Exemplary temperatures include below the freezing temperature, at the freezing temperature, and above the freezing temperature. The capsule composition may be varied such that it melts at a predetermined temperature. Thus, the device may also be used to indicated whether a high temperature has been met or exceeded.

19 Claims, 3 Drawing Sheets

U.S. PATENT DOCUMENTS 3,822,189 A 7/1974 Tornamarck ................. 435/12
3,958,528 A 5/1976 Hill ............................ 116/219
4,022,149 A * 5/1977 Berger ........................ 116/219
4,028,876 A 6/1977 Delatorre ..................... 368/89
4,120,818 A 10/1978 Swindells et al. .......... 116/207
4,132,186 A * 1/1979 Manske et al. ............. 116/216
4,145,918 A 3/1979 Couch et al. ............... 116/216
4,148,748 A 4/1979 Hanlon et al. .............. 252/408
4,163,427 A 8/1979 Cooperman et al. ........ 116/217
4,191,125 A 3/1980 Johnson ...................... 116/219
4,280,361 A 7/1981 Sala ........................... 116/216
4,327,117 A 4/1982 Lenack et al. ................ 426/88
4,457,252 A 7/1984 Manske ...................... 116/216
4,601,588 A 7/1986 Takahara et al. ............ 374/106
4,784,876 A 11/1988 Walker, Jr. et al. ......... 427/150
5,085,802 A 2/1992 Jalinski ................... 252/408.1
5,111,768 A 5/1992 Larsson et al. ............. 116/216
5,182,212 A 1/1993 Jalinski ......................... 436/2
5,239,942 A 8/1993 Ignacio et al. .............. 116/219
5,254,473 A * 10/1993 Patel ............................. 436/1
5,404,834 A 4/1995 Murphy ...................... 116/216
5,695,284 A * 12/1997 Waters ....................... 374/162
5,964,181 A * 10/1999 Pereyra et al. .............. 116/216
6,030,118 A 2/2000 Schneider et al. .......... 374/160

* cited by examiner

CHANGED CONDITION INDICATOR

CROSS-REFERENCE TO RELATED APPLICATIONS

This application is a Continuation-in-Part of U.S. patent application Ser. No. 09/925,538 filed on Aug. 10, 2001, now U.S. Pat. No. 6,694,913, which is incorporated herein by reference in its entirety.

BACKGROUND OF THE INVENTION

1. Field of the Invention

This invention relates to an indicating apparatus and method of manufacture. More particularly, this invention relates to devices for indicating a change in condition by producing a color change and methods of manufacture therefor.

2. Description of the Related Art

In the preparation and storage of foodstuffs, both raw and cooked, it is desirable to have some manner of indicating whether frozen items have previously been thawed. This is true in both home and commercial (such as a grocery store, supermarket, or restaurant) settings. Such information is useful from health, safety, and nutritional standpoints.

In the healthcare industry, it is well known that some vaccines, blood, various medications, etc. are temperature-sensitive. Because such materials may not function properly if frozen and then thawed, it is not only desirable but also essential to know whether these materials have been previously frozen. Similarly, it would be very beneficial to know whether material, which is stored frozen, is allowed to thaw and subsequently is refrozen. Furthermore, it would be very beneficial to know whether material has been cooled below and then heated above a threshold temperature other than the freezing temperature (i.e., above or below the freezing temperature).

It is also desirable in the foodstuff, medical, and other industries to know whether material has been raised above a certain temperature. For example, some vaccines are known to not function properly if stored above a certain temperature. Thus, it would be beneficial to know whether stored material has previously been heated above a predetermined temperature.

Maximum-minimum thermometers may be used to indicate the range of temperatures to which an item has been exposed. However, the use of such apparatus with every item in a frozen food department of a grocery store or supermarket, or with every container of vaccine, blood, drug, or other heat fragile item, is both impracticable and prohibitively costly.

Freeze-thaw indicators are known. For example, the Applicant's previous patent, U.S. Pat. No. 4,163,427, which is incorporated by reference herein in its entirety, discloses an apparatus in which melting ice is used to activate a dye formation in producing a color indication of thawing. The present invention uses a pigment rather than a dye to indicate a transition over the threshold temperature. The use of a pigment allows for a greater clarity of indication, a reduced chance of error, and a reduction in manufacturing costs.

Another known device is marketed under the name "Cold-Mark Freeze Indicators." This device comprises three liquids that provide a color change upon extended exposure below a certain temperature and another color change upon extended exposure above the temperature. However, this device is much larger than, and much more expensive than, the device of the present invention.

SUMMARY OF THE INVENTION

It is an object of the present invention to provide an apparatus for indicating a change in condition.

It is a further object of the present invention to provide an apparatus for indicating a transition over a threshold temperature.

It is a further object of the present invention to provide an apparatus for indicating a change in time.

It is a further object of the present invention to provide an improved indicator apparatus.

It is a further object of the present invention to provide a reliable indicator apparatus.

It is a further object of the present invention to provide an inexpensive indicator apparatus.

It is a further object of the present invention to provide an indicator apparatus that uses a pigment indicator.

It is a further object of the present invention to provide an indicator apparatus that can use a single frangible capsule.

It is a further object of the present invention to provide an indicator apparatus that can be used to monitor a small item, such as an individual vaccine vial.

It is a further object of the present invention to provide an indicator apparatus that creates a brilliant color upon an appropriate temperature transition.

The above list of objects of the present invention is exemplary in nature. Additional features and advantages may be apparent to those skilled in the relevant arts. Furthermore, not every one of the listed objectives may be met in every embodiment of the present invention. The apparatus of the present invention indicates a temperature transition condition using two reactants that combine to produce a pigment. A pigment is insoluble in the medium in which it is applied, while a dye is soluble. The use of a pigment is superior to the use of a dye since, for example, a pigment can produce a more brilliant color with smaller amounts of each reactant. Additionally, pigment reactants are less likely to produce a color change with anything other than the complementary reactant.

A housing is provided. One or more capsules are provided within the housing. As used herein, "capsule" refers to any closed receptacle and includes microcapsules. A first reactant and a liquid are provided inside the capsule. The liquid is chosen such that it expands upon freezing. The capsule is designed such that when the liquid freezes and expands, the capsule fractures. A second reactant is provided within the housing. The location of the second reactant and the means of coupling (if any) to the housing may take various forms. For example, the second reactant may take the form of a coating on the housing. The second reactant may also be mixed with an adhesive for coupling the second reactant to the housing. The second reactant may also take the form of a coating on the outside of the capsule. The second reactant may be coupled to a piece of material, such as paper, and the material placed inside the housing.

When the capsule and the liquid located therein freeze, the liquid expands. Since the capsule does not expand upon freezing, the expansion of the liquid fractures the capsule. When the capsule is subsequently thawed, the liquid melts, releasing the first reactant. The first and second reactants then combine to form a pigment. The pigment is a brilliant color that is chosen to be a different color than the housing, allowing a person viewing the changed condition indicator device to quickly and easily know whether the device has been previously frozen and thawed.

The device of the present invention may also be used as a high temperature indicator, either alone or in conjunction with the low temperature indicator embodiment as a dual indicator. The composition of the capsules may be altered such that the capsules will melt at a predetermined high temperature. When the capsules are raised to this temperature, the melt, releasing the enclosed reactant. The reactants then mix, forming a pigment.

The device of the present invention may be attached to any number of items in order to determine whether the temperature of items has been allowed to increase above a threshold temperature. Exemplary threshold temperatures include the freezing temperature and a temperature above which the item being monitored will be rendered ineffective. Exemplary preferred items to monitor include, but are not limited to, vaccines, other medications, food, and other temperature-sensitive items.

The device of the present invention may also be initiated manually. Rather than fracture via expansion upon freezing, the device of the current invention can be initiated by manually fracturing the capsule, thus allowing the device to be used as a time-temperature indicator.

BRIEF DESCRIPTION OF THE DRAWINGS

The present invention is described with reference to the accompanying drawings, in which like reference characters reference like elements, and wherein.

DETAILED DESCRIPTION OF THE INVENTION

Figure 1:
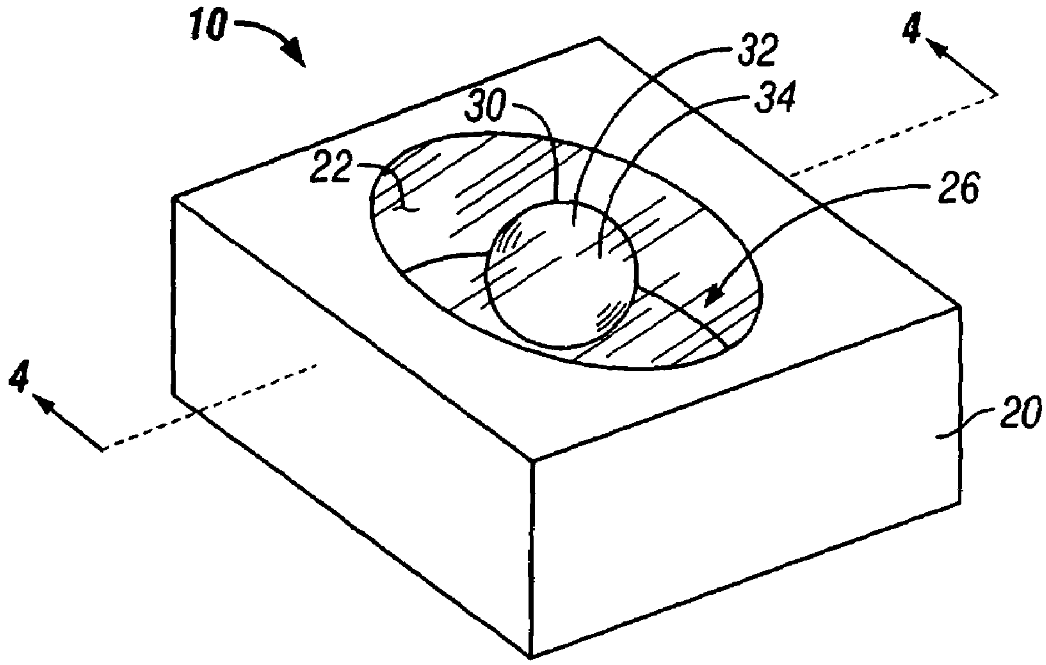
FIG. 1 is a perspective view of a preferred embodiment of the indicator of the present invention.

FIG. 1 is a perspective view of a preferred embodiment of the indicator of the present invention. For exemplary purposes only, the embodiment of a freeze-thaw indicator will be discussed; however, other embodiments are equally available for use. The device 10 comprises a housing 20 and a capsule 30. Housing 20 defines an interior 22. Interior 22 is bounded by a first surface 24 and a second surface 27 (see FIG. 4). A first reactant 26 is provided within housing 20. Reactant 26 may be located within housing 20 in various ways. For example, reactant 26 can be applied directly to surface 24 or reactant 26 may be applied to a piece of material, such as filter paper, and the material placed inside housing 20. In addition to filter paper, other carriers may also be used with the present invention.

Capsule 30 is located within housing 20. Capsule 30 contains a second reactant 32. Capsule 30 also contains a liquid 34. Liquid 34 is chosen such that it expands upon freezing. A preferred form of liquid 34 is an aqueous solution. Capsule 30 is designed such that it will fracture when liquid 34 freezes. After fracture, reactant 32 can escape capsule 30 to mix with reactant 26. This will not occur, however, while device 10 is in a frozen condition. When device 10 enters a thawed condition, liquid 34 melts/thaws, releasing reactant 32. Reactant 32 then mixes with reactant 26 to form a pigment, indicating that device 10 has made the transition from a frozen condition to a thawed condition. Note that the rigidity of housing 20 can function as a means to protect against crushing of capsule 30.

Figure 2:
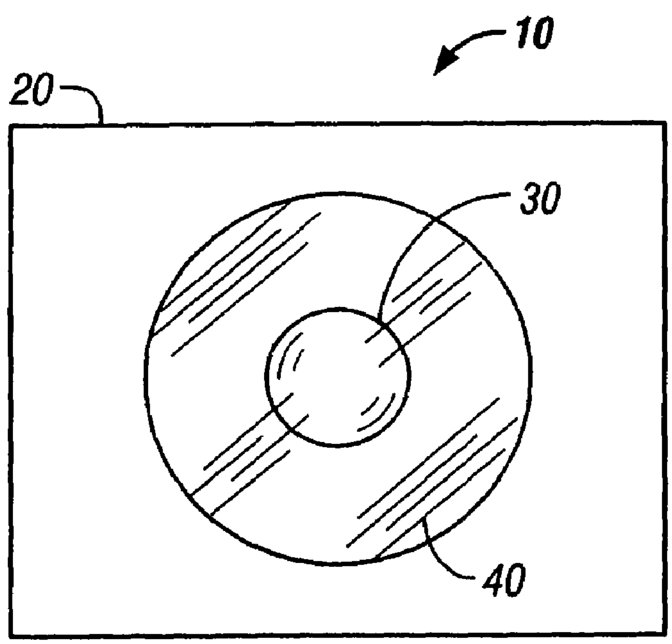
FIG. 2 is a top view of the indicator of FIG. 1 indicating a safe condition.

FIG. 2 is a top view of the freeze-thaw indicator of FIG. 1 indicating a safe condition. Either device 10 has never been frozen or has been frozen and not thawed. One can view first surface 24 through second surface 27. In this condition, surface 24 has a first color 40.

Figure 3:
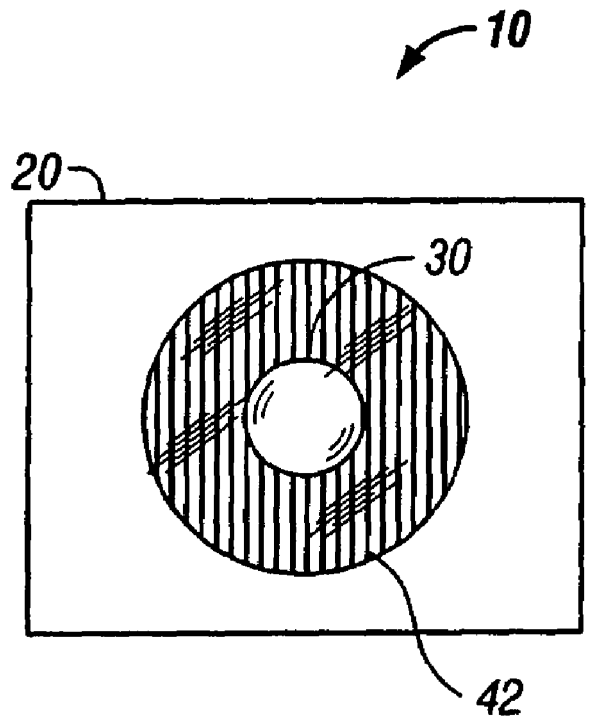
FIG. 3 is a top view of the indicator of FIG. 1 indicating a transition from a temperature below the threshold temperature to a temperature above the threshold temperature.

FIG. 3 is a top view of the freeze-thaw indicator of FIG. 1 indicating a transition from a frozen condition to a thawed condition. Device 10 has been frozen and capsule 30 has been fractured. Reactants 32 and 26 have combined to form a pigment. This pigment causes surface 24 to become brilliantly colored to a second color 42, color 42 being different than color 40. Alternatively, if reactant 26 were placed on a piece of material, the material and not necessarily surface 24 will become colored upon mixture of reactants 26, 32. Thus a person can easily determine whether device 10—and therefor any item to which device 10 has been attached—has previously been frozen and thawed.

Figure 4:
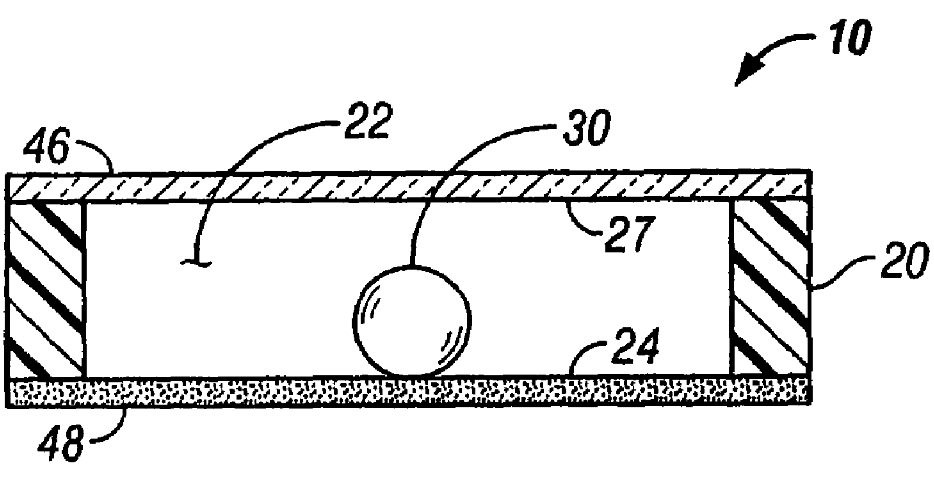
FIG. 4 is a sectional view of the indicator of FIG. 1 taken along line 4—4.

FIG. 4 is a sectional view of the freeze-thaw indicator of FIG. 1 taken along line 4—4. It is seen that in a preferred embodiment, housing 20 can have two layers 46, 48. At least a portion of layer 46 is transparent, allowing one to view inside housing 20. At least a portion of layer 48 contains an adhesive, allowing device 10 to be coupled to an item to be monitored. One preferred material for housing 20 is foam-board. This material is readily available and inexpensive. Another preferred material for housing 20 is cork. Cork is also readily available and is less crushable than foam-board, which facilitates the manufacturing process. However, housing 20 can be made of any suitable material.

For illustrative purposes only, a preferred manufacturing process will be discussed using cork as the material of housing 20. Device 10 may be manufactured by first providing an amount of cork, preferably in the form of a roll. The cork can then be machined in known fashion to form interior 22. Several interiors 22 can be formed simultaneously. Preferably, the cork has already been treated with an adhesive on each side. Alternatively, adhesive can be applied subsequent to machining interiors 22 in the cork. Once interior 22 has been formed, first reactant 26 can be added. Reactant 26 may be applied to a piece of material, such as paper, and that material placed within interior 22. Capsule 30, which has been manufactured previously and has second reactant 32 and liquid 34 located therein, is then added to interior 22. Transparent layer 46 and adhesive layer 48 can then be added on either side of housing 20, creating a closed volume for interior 22. A preferred method of attachment is lamination. The completed device 10 can then be coupled to an item to be monitored. It should be noted that the order of the steps of the above process can be altered. For example, transparent layer 46 or adhesive layer 48 can be applied to housing 20 prior to adding first reactant 26. In this manner, first reactant 26 can be applied directly to transparent layer 46 or adhesive layer 48.

The reactants discussed above cooperate to form a pigment upon mixing. Use of a pigment as an indicator is better than use of a dye for several reasons. First, pigments are insoluble in water and are solid particles rather than solutions. Dyes completely dissolve in water and are, therefore, solutions. Thus, a smaller amount of each reactant is needed to create a reliable indicator with a pigment than with a dye. This allows an indicator using pigment reactants to use fewer capsules and be smaller than an indicator using dye reactants. As few as a single capsule may be used with the present invention. A smaller indicator may be attached to more items—such as an individual vaccination vial—than are possible with a larger indicator.

Secondly, it is possible to get more "color" into pigments than into dyes. Therefore, pigmented colors tend to be more vibrant and brilliant than dye-based colors. A more brilliant, vibrant color is desirable with a changed condition indicator to increase readability and decrease the likelihood of an erroneous reading. Thus, an indicator with pigment reactants is more reliable than one with dye reactants.

Thirdly, pigment reactants are less likely to react with anything other than the complementary reactant. Thus, an indicator with pigment reactants is more reliable than one with dye reactants.

Finally, the molecules in a dye are spread out and are therefore prone to fading. The molecules in a pigment are spaced closer together and are therefore less prone to fading. If the color in an activated indicator (that is, an indicator that has been cooled below and then heated above the threshold temperature) fades, one might erroneously be lead to believe that the item to which the indicator is attached has been continuously maintained below the threshold temperature. As discussed above, this could lead to grave consequences. Thus, an indicator with pigment reactants is more reliable than one with dye reactants.

Exemplary preferred reactants include water soluble sodium dimethylglyoxime and any water soluble nickel salt, such as nickel chloride. The sodium dimethylglyoxime could be inside the capsule and the nickel salt outside or vice versa. These reactants combine to form a brilliant scarlet, solid, colloidal crystal. These reactants are highly specific and are unlikely to form such a color with other substances. Other pigment reactants may also be used with the indicator of the present invention and other pigment colors may be produced upon a freeze-thaw transition. Once the reactants combine to form a pigment, the pigment remains even if the device is subsequently refrozen.

The capsules that are used with the present invention were manufactured using the equipment described in U.S. Pat. No. 3,389,194, the disclosure of which is incorporated herein in its entirety. Three capsule shell materials were developed. The first shell composition was made of paraffin wax. The second shell composition was made of a paraffin wax blended with a hydrocarbon resin. The third shell composition was made of a paraffin wax blended with a hydrocarbon resin and a polyethylene. Piccolyte S-115 is a preferred hydrocarbon resin. All the capsules were prepared with 5% dimethylglyoxime as a solute in water and the fill to shell ratio ranged from 50/50 to 60/40. Upon testing, the third shell composition was found to result in more completely cracked capsules upon freezing.

A preferred composition comprises 40% paraffin wax, 50% piccolyte S-115 (a hydrocarbon resin), and 10% polyethylene, with a 60% fill to 40% shell ratio. This composition was found to result in proper brittleness at freezing so that assurance of capsule cracking was increased.

The capsule composition may also be altered to provide a high temperature indicator. For example, pure paraffin wax melts at approximately 95° F. Thus, if the capsules are formed of pure paraffin wax, they will melt at approximately 95° F., allowing the reactants to mix and causing a color change. Additives, such as polyethylene, may be added to the paraffin to increase the melting temperature without adversely affecting brittleness. Thus, by selectively adding polyethylene to the paraffin wax and creating the capsules, they may be designed to melt at a predetermined temperature. The indicator can therefore function as a high temperature indicator. Note that this high temperature indicator embodiment may be used in conjunction with the low temperature embodiments discussed above and below, resulting in a dual indicating device.

Although the capsules were filled with a 5% solution of dimethylglyoxime and the co-reactant was located externally to the capsules, the location of the reactants could have been reversed. Also, the capsules could be loaded with a reducing agent such as a 10% solution of sodium bisulfite, or an acid solution, or a base solution and placed upon a colored matrix which when reduced, acidified or alkalinized changes from one color to another.

The threshold temperature at which the device of the present invention will indicate a changed condition may be varied by varying the composition of liquid 34. By adding and varying the composition of sodium dimethylglyoxime within liquid 34 within capsules 30, capsules 30 may be made to fracture at temperatures as low as −26° C. This allows indicator 10 to be used with items that should be maintained at a temperature below freezing, such as frozen vaccines.

Varying the composition of sodium dimethylglyoxime within liquid 34 may be accomplished by adding salt (NaCl) to water ($H_2O$) and encapsulating the mixture within capsule 30. By controlling the amount of salt, according to the well-known Arrenhius equation, the freezing point of liquid 34 can be adjusted to freeze, and therefore fracture capsule 30, at any temperature between 0° C. and approximately −26° C. An unexpected advantage of the salt addition is that the intensity of the color change that occurs when nickel-dimethylglyoxime pigment is formed is greater than when no additional salt other than the sodium dimethylglyoxime is present in the aqueous solution 34.

Other substances, such as propylene glycol, glycerin, magnesium chloride, calcium chloride and/or other salts, may be used to lower the freezing point of liquid 34. However, sodium chloride (NaCl) is preferred because it is inexpensive and non-toxic. Additionally, while other metallic salts might adversely interfere with the reaction, sodium chloride essentially does not, and, if anything, enhances the reaction. This is probably due to the common ion (sodium or chloride or both) effect. Substances such as alcohol, acetone, propylene glycol, and glycerin are not preferred for use in altering the freezing temperature of liquid 34 since they may soften the shell of capsule 30 if a wax composition is used.

Table I, which was taken from "Lange's Handbook of Chemistry," Revised Tenth Edition (1966), illustrates the percent salt in an aqueous solution and the lowered freezing point resulting therefrom.

TABLE I

| % NaCl | Spec. Gravity | Freezing Point | |
|---|---|---|---|
| by weight | 15° C. (59° F.) | ° C. | ° F. |
| 0 | 1.000 | 0.00 | 32.0 |
| 1 | 1.007 | −0.58 | 31.0 |
| 2 | 1.014 | −1.13 | 30.0 |
| 3 | 1.021 | −1.72 | 28.9 |
| 4 | 1.028 | −2.35 | 27.8 |
| 5 | 1.036 | −2.97 | 26.7 |
| 6 | 1.043 | −3.63 | 25.5 |
| 7 | 1.051 | −4.32 | 24.2 |

TABLE I-continued

| % NaCl by weight | Spec. Gravity 15° C. (59° F.) | Freezing Point ° C. | ° F. |
|---|---|---|---|
| 8 | 1.059 | −5.03 | 22.9 |
| 9 | 1.067 | −5.77 | 21.6 |
| 10 | 1.074 | −6.54 | 20.2 |
| 11 | 1.082 | −7.34 | 18.8 |
| 12 | 1.089 | −8.17 | 17.3 |
| 13 | 1.097 | −9.03 | 15.7 |
| 14 | 1.104 | −9.94 | 14.1 |
| 15 | 1.112 | −10.88 | 12.4 |
| 16 | 1.119 | −11.90 | 10.6 |
| 17 | 1.127 | −12.93 | 8.7 |
| 18 | 1.135 | −14.03 | 6.7 |
| 19 | 1.143 | −15.21 | 4.6 |
| 20 | 1.152 | −16.46 | 2.4 |
| 21 | 1.159 | −17.78 | 0.0 |
| 22 | 1.168 | −19.19 | −2.5 |
| 23 | 1.176 | −20.69 | −5.2 |
| 23.3 (E) | 1.179 | −21.13 | −6.0 |
| 24 | 1.184 | −17.0* | 1.4* |
| 25 | 1.193 | −10.4* | 13.3* |
| 26 | 1.201 | −2.3* | 27.9* |
| 26.3 | 1.203 | 0.0* | 32.0* |

*Saturation temperatures of sodium chloride dihydrate; at these temperatures $NaCl_2H_2O$ separates leaving the brine of the eutectic composition (E).

Color-coding may be used to differentiate the threshold temperature of the capsules. For example, one set of capsules 30 may be made with the natural color of the standard formulation discussed above. Another set of capsules may be prepared with salt added to the liquid 34 to adjust to the required threshold temperature, these capsules 30 being dyed light blue to distinguish them. No other change to the indicators 10 is necessary, and the same manufacturing process may be used.

Alternatively, the composition of liquid 34 could be varied such that it freezes at a temperature above 0° C. Thus, exemplary threshold temperatures include below the freezing temperature, at the freezing temperature, and above the freezing temperature. It may be desirable to determine whether capsules 30 are suitable for use prior to manufacturing device 10. To do this, one can immerse capsules 30 in a solution containing a complementary reactant to that included within capsule 30. For example, if sodium dimethylglyoxime is used as the reactant within capsules 30, the solution can contain a solution of nickel chloride. A preferred solution contains 5% nickel chloride in water, to which 20% by weight glycerol is added. If a capsule is already fractured, and therefore unsuitable for use, the reactants will combine to produce a brilliant pigment when the capsule is immersed in the solution. Those capsules that do not produce a color change are suitable for use and may be separated for subsequent use in the present invention.

During testing of the present invention, it was discovered that capsules tested according to the above process retained a coating of reactant on the outer surface of the capsule 30 when removed from the solution and allowed to dry. When the capsules 30 that tested as good for use were subsequently fractured, the reactant inside capsule 30 combined with the reactant on the outer surface of capsule 30 to form a brilliant pigment. This indicates that capsules 30 may be coated with the second reactant and used in the device 10 of the present invention, without the need of separately including a reactant in the interior 22 of housing 20.

Figure 5:
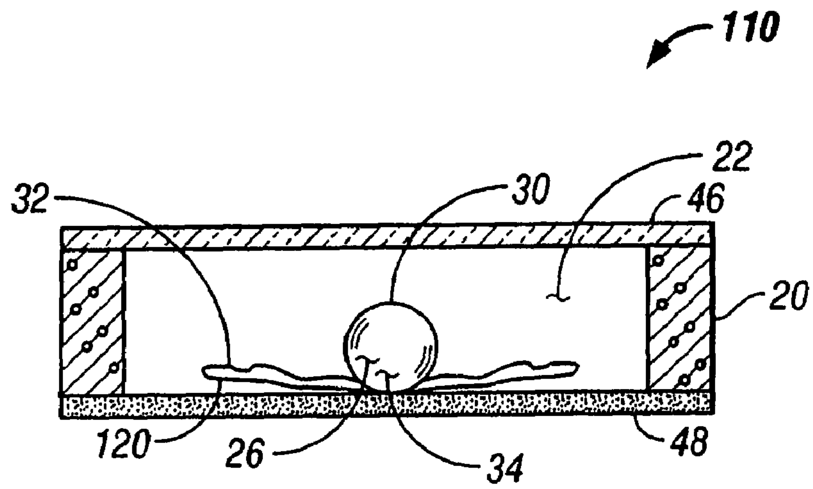
FIG. 5 is a sectional view of another preferred embodiment of the indicator of the present invention.

FIG. 5 is a sectional view of another preferred embodiment of the freeze-thaw indicator of the present invention. Device 110 comprises a housing 20 and a capsule 30 (described above). Housing 20 includes layers 46, 48 and defines a volume 22. Capsule 30 has a first reactant 26 and a liquid 34 included therein. Liquid 34 is chosen such that it expands upon freezing. Device 110 further comprises a piece of material 120. Material 120 may be impregnated with second reactant 32. Alternatively, reactant 32 may be topically applied to material 120. Material 120 may take any desired form, as long as it is able to host reactant 32. Preferred forms of material 120 include, but are not limited to, paper (such as filter paper) and cotton. Upon freezing and expansion of liquid 34, capsule 30 fractures. Upon subsequent melting or thawing of liquid 34, reactant 26 is released from capsule 30 such that it contacts material 120 and reactant 32. Reactants 26 and 32 cooperate to form a brilliant pigment, notifying a viewer that device 110—and therefor any item to which device 110 has been attached—has previously been cooled below and then heated above the threshold temperature.

Figure 6:
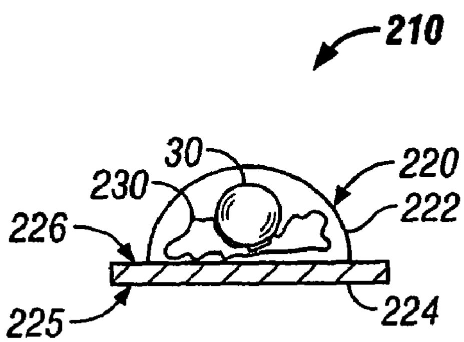
FIG. 6 is a sectional view of another preferred embodiment of the indicator of the present invention.

FIG. 6 is a sectional view of another preferred embodiment of the changed condition indicator of the present invention. Device 210 comprises a capsule 30 (described above) and a blister pack 220. Blister packs 220 are known and commonly used to package, for example, over-the-counter medications. Blister pack 220 includes a cover 222 and a backing 224. Cover 222 is substantially transparent, allowing one to view inside device 210. Backing 224 includes a first surface 225. An adhesive may be applied to surface 225 to couple device 210 to an item to be monitored. A first reactant is included within capsule 30. A second reactant may be applied to a piece of material 230, which is enclosed along with capsule 30 within blister pack 220. Alternatively, the second reactant may be applied to a second surface 226 of backing 224 using, for example, an adhesive such as latex. A preferred adhesive is polyvinyl acetate latex; a preferred reactant-latex mix includes 10–20% by volume latex. Alternatively, the second reactant may be applied to the outer surface of capsule 30. With the latter two alternatives, material 230 is not required. As discussed above, when capsule 30 fractures upon freezing and subsequently thaws, the reactants combine to form a pigment, notifying an observer that the item to which device 210 is attached has experienced a changed condition.

Figure 7:
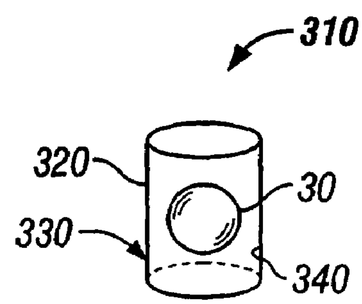
FIG. 7 is a sectional view of another preferred embodiment of the indicator of the present invention.

FIG. 7 is a sectional view of another preferred embodiment of the freeze-thaw indicator of the present invention. Device 310 comprises a housing 320 and a capsule 30. Housing 320 is substantially cylindrical and has an outer surface 330. The longitudinal ends of housing 320 may be crimped or sealed in any known manner. Device 310 may be attached to an item to be monitored in known manner, such as by applying an adhesive to surface 330. The reactants are included in any manner described above. Upon a freeze-to-thaw transition, the reactants mix as described above to produce a vibrant color, allowing one to easily determine whether the item to which device 310 is attached has been previously frozen and thawed.

Figure 8:
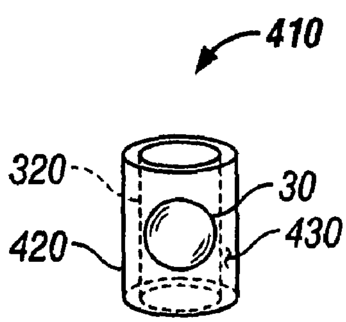
FIG. 8 is a sectional view of another preferred embodiment of the indicator of the present invention.

FIG. 8 is a sectional view of another preferred embodiment of the changed condition indicator of the present invention. The device 410 of FIG. 8 is similar to the device 310 of FIG. 7, but includes an additional housing 420. Housing 420 and housing 320 cooperate to define a volume 430. Volume 430 functions as an air space, which is an insulator. This insulation may prevent obtaining a premature indication of a thaw condition. The amount of insulation can be varied as desired by varying the relative diameters of the housings 320, 420 (which therefore will vary the size of volume 430).

A preferred method of including the second reactant for the embodiments of FIGS. 7 and 8 is to prepare a reactant-latex mix as described above. The reactant-latex mix can then be drawn into the housing 320, such as by suction. The reactant-latex mix can then be removed from housing 320, such as by draining due to gravity. A film of the mix will remain on an inner surface 340 of housing 320. During testing, it was discovered that a film formed accordingly contained enough reactant to produce a vibrant color change upon a changed condition. This process worked on a housing made of polyethylene, which is known not to be easily coated. This process also worked on a paraffin wax coating of the capsules themselves. This process is fast, inexpensive, and readily adaptable to devices of virtually any size.

By changing the reactants, the device of the present invention may also be used as a time-temperature indicator. For example, by coating the housing with a gelatin-immobilized urease (an enzyme that breaks down urea to ammonia and carbon dioxide) together with a mixture of pH indicators and filling the capsule with a urea solution, upon fracture of the capsule the reactants will mix. This will allow the urease to produce the breakdown products of urea in response to time and temperature according to the Arrenhius equation. As these products (ammonia and carbon dioxide) accumulate in response to time, temperature, or both, the pH of the coating will change. This change in pH will result in a color change based on the indicators chosen. The concentration of the urea solution can be varied in concentration to allow for various time or temperature scenarios. Note that the capsule can be fractured by either external or internal pressure. Other chemical combinations may also be used.

By providing a relatively flexible (or at least less rigid) housing 20, 220, 320, 420, a user can initiate the process by manually fracturing capsule 30. This can be done, for example, by squeezing housing 20, 220,320, 420. The device 10, 110,210,310, 410 can then be attached to an item to be monitored. By doing so, an observer can determine how long the item being monitored has been in its current condition (for example, held at room temperature). Note that by providing a less rigid housing 20, 220, 320, 420, there is no need to freeze the device 10, 110, 210, 310, 410 prior to use. Device 10, 110, 210, 310, 410, when used as a time-temperature indicator, is of the same design and manufacturing as described above with respect to the changed condition indicators.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents.

What is claimed is:

1. A device for indicating a transition from below a threshold temperature to above the threshold temperature, comprising:

a housing having a first surface, at least a portion of said first surface being of a first color;

a first reactant located within said housing; and a capsule containing a liquid and a second reactant, said capsule being located within said housing;

wherein said liquid freezes at the threshold temperature and expands upon freezing; wherein said first and said second reactants cooperate to produce a pigment upon mixing;

wherein said pigment is of a second color, said second color being different than said first color; and wherein one of said first and said second reactants is a nickel salt and the other of said first and said second reactants is sodium dimethylglyoxime.

2. The device of claim 1, wherein the threshold temperature is less than the temperature at which water freezes.

3. The device of claim 1, wherein the threshold temperature is greater than the temperature at which water freezes.

4. The device of claim 1, wherein said capsule is designed such that it will fracture due to the expansion of said liquid upon freezing.

5. The device of claim 1, wherein said housing has a second surface opposite said first surface, said second surface including a transparent portion for allowing one to view said first surface.

6. The device of claim 1, wherein said housing has a third surface, said third surface having an adhesive attached thereto for attaching said device to a product to be monitored.

7. The device of claim 1, wherein said capsule is designed such that it will melt at a predetermined temperature.

8. A device for indicating a transition from below a threshold temperature to above the threshold temperature, comprising:

a housing defining an interior, at least a portion of said interior being of a first color;

a first reactant located within said housing; and a capsule containing a liquid and a second reactant, said capsule being located within said interior of said housing;

wherein said liquid freezes at the threshold temperature and expands upon freezing; wherein said first and said second reactants cooperate to produce a pigment upon mixing;

wherein said pigment is of a second color, said second color being different than said first color; and wherein one of said first and said second reactants is a nickel salt and the other of said first and said second reactants is sodium dimethylglyoxime.

9. The device of claim 8, wherein the threshold temperature is less than the temperature at which water freezes.

10. The device of claim 8, wherein the threshold temperature is greater than the temperature at which water freezes.

11. The device of claim 8, further comprising an adhesive for coupling said first reactant to said interior of said housing.

12. The device of claim 8, wherein said capsule is designed such that it will melt at a predetermined temperature.

13. A device for indicating a transition from below a threshold temperature to above the threshold temperature, comprising:

a housing defining an interior, said interior being of a first color;

a capsule located within said interior of said housing, said capsule defining an interior volume and containing a liquid and a first reactant within said volume, said capsule having an exterior surface; and a second reactant located on said exterior surface of said capsule;

wherein said liquid freezes at the threshold temperature and expands upon freezing; wherein said first and said second reactants cooperate to produce a pigment upon mixing;

wherein said pigment is of a second color, said second color being different than said first color; and wherein one of said first and said second reactants is a nickel salt and the other of said first and said second reactants is sodium dimethylglyoxime.

14. The device of claim 13, wherein the threshold temperature is less than the temperature at which water freezes.

15. The device of claim 13, wherein the threshold temperature is greater than the temperature at which water freezes.

16. The device of claim 13, wherein said capsule is designed such that it will melt at a predetermined temperature.

17. A dual indicating device, comprising:

a housing having a first surface, at least a portion of said first surface being of a first color;

a capsule containing a liquid and a first reactant, said capsule being located within said housing; and a second reactant;

wherein said liquid freezes at a first predetermined temperature and expands upon freezing;

wherein said capsule is designed such that it will fracture due to the expansion of said liquid upon freezing;

wherein said capsule is designed such that it will melt at a second predetermined temperature;

wherein said first and said second reactants cooperate to produce a pigment upon mixing;

wherein said pigment is of a second color, said second color being different than said first color; and wherein one of said first and said second reactants is a nickel salt and the other of said first and said second reactants is sodium dimethylglyoxime.

18. The device of claim 17, wherein said second reactant is located within said housing.

19. The device of claim 17, wherein said second reactant is located on an exterior surface of said capsule.

* * * * *